United States Patent
Agner

(10) Patent No.: US 6,875,139 B2
(45) Date of Patent: Apr. 5, 2005

(54) CONTROL SYSTEM

(75) Inventor: Ivo Agner, Bad Homburg (DE)

(73) Assignee: Luk Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 09/945,542

(22) Filed: Sep. 2, 2001

(65) Prior Publication Data

US 2002/0042324 A1 Apr. 11, 2002

(30) Foreign Application Priority Data

Sep. 15, 2000 (DE) .......................... 100 45 763

(51) Int. Cl.⁷ ............................................. F16H 55/52
(52) U.S. Cl. ........................................ 474/46; 474/69
(58) Field of Search ............................. 474/28, 46, 70, 474/69

(56) References Cited

U.S. PATENT DOCUMENTS

| | | | | |
|---|---|---|---|---|
| 4,899,785 A | * | 2/1990 | Inokuchi | 137/625.65 |
| 5,002,091 A | * | 3/1991 | Inokuchi | 137/625.65 |
| 5,199,313 A | * | 4/1993 | Muller | 74/335 |
| 5,342,246 A | * | 8/1994 | Mori | 474/1 |
| 5,836,207 A | * | 11/1998 | Spooner et al. | 74/335 |
| 5,957,260 A | * | 9/1999 | Kunii | 192/85 R |
| 5,992,590 A | * | 11/1999 | Harries | 192/3.58 |
| 6,073,644 A | * | 6/2000 | Friedmann et al. | 137/1 |
| 6,477,446 B1 | * | 11/2002 | Holtmann et al. | 700/281 |

FOREIGN PATENT DOCUMENTS

| | | | | |
|---|---|---|---|---|
| EP | 487134 | * | 5/1992 | ........... F16H/61/00 |
| JP | 124806 | * | 7/1983 | ................... 91/461 |

* cited by examiner

Primary Examiner—David A. Bucci
Assistant Examiner—Vicky A. Johnson
(74) Attorney, Agent, or Firm—Alfred J. Mangels

(57) ABSTRACT

A method and a control system for supplying a working medium to a hydraulically-operated device. The working medium pressure is adjusted as a function of a control variable provided by a pressure control valve or a pressure reduction valve, both within a nominal working pressure range and also within a maximum working pressure range that lies between the nominal range and a system pressure value. For the same change in the control variable, the working medium pressure is changed by a greater amount in the maximum pressure range than it is in the nominal pressure range. Thus, in the nominal pressure range a precise adjustment of the working pressure can be made, and in the maximum pressure range a larger working pressure adjustment can be made to respond to suddenly increased external forces that act on the hydraulic device.

13 Claims, 2 Drawing Sheets

CONTROL SYSTEM

BACKGROUND OF THE INVENION

1. Field of the Invention

The present invention relates to a method for supplying a hydraulically-operated device with a working medium, as well as to a control system for supplying a hydraulically-operated device with a working medium.

2. Description of the Related Art

It is known to supply a hydraulically-operated device with a working medium, wherein the pressure of the working medium can be adjusted as a function of a control variable through pressure limiting or pressure reduction. For that purpose, conventional pressure limiting or pressure reduction valves are provided that can be controlled by a control means, for example a pilot-controlled proportional valve. In order to allow the hydraulic device to work at various operating points, the working medium pressure that is adjusted by pressure limiting or pressure reduction can be varied within a nominal pressure range. For a hydraulic device on which external forces influence the power output, a feature is provided to allow the working medium pressure to be adjusted beyond the nominal pressure range for certain external force values. For example, for hydraulic adjusting devices it can be necessary to increase the working pressure range beyond the nominal pressure range in order to achieve the desired adjustment result. Thus, the working medium pressure can also be adjusted in a maximum pressure range, wherein that maximum pressure range is between the nominal pressure range and a system-related maximum pressure.

The adjusted working medium pressure acting on the hydraulic device is, as mentioned above, a function of the control variable. That means that in the case of control with an electrical control variable, the working medium pressure rises if the control variable, especially an electric current, increases as well. Of course, the opposite can also be provided, so that the working medium pressure rises with decreasing electric current. There is therefore a proportionality between the control variable and the working medium pressure. When that relationship is plotted in a coordinate system, with the control variable being entered on one of the coordinate axes and the working medium pressure on the other coordinate axis, the result is a nearly straight characteristic line with a constant slope across the entire control variable range.

A disadvantage is that with the application of greater pressure intensification, because the characteristic line has the same slope over the entire nominal pressure range and the entire maximum pressure range, it therefore proceeds relatively steeply. That is particularly the case when the upper pressure limits in the nominal and maximum pressure ranges are far apart. Due to the high pressure intensification, a relatively small change in the control variable therefore effects a very large change in the working medium pressure for the hydraulically-operated device. That is particularly disadvantageous in the nominal pressure range, because the working medium pressure should be adjusted relatively precisely to the hydraulically-operated device.

For example, in automatic transmissions with stepless gear ratio means, particularly belt-driven, conical pulley transmissions, the conventional method for controlling the pressure of the conical disks against the endless, torque-transmitting member is disadvantageous, because in the nominal pressure range the application pressure cannot be adjusted very precisely. The application pressure must be adjusted precisely as a function of the torque to be transmitted. Imprecise adjustment particularly affects the efficiency of the transmission, because too high an application pressure impairs efficiency. In the case of too low an application pressure, there is a risk that the endless, torque-transmitting member will slip and will damage the conical disks. The high pressure intensification in the known method or the known control system affects the overall hysteresis of the control system, wherein the overall hysteresis is composed of the hysteresis of the control means and of the pressure limiting or pressure reduction valve.

That means that the overall hysteresis is composed of the hysteresis of the control means multiplied by the pressure intensification and the valve body member hysteresis force, divided by the pressure feedback area, which should be regarded as the quotient of the pilot surface area and the pressure intensification. Pressure intensification as a factor, therefore, has a great influence on the overall hysteresis.

The purpose of the invention, therefore, is to provide a method and a control system for supplying a hydraulically-operated device with a working medium, and that do not produce the above-described disadvantages.

SUMMARY OF THE INVENTION

That purpose is achieved with a method for supplying a hydraulically-operated device with a working medium with the features hereinafter described. It is advantageous in a situation in which the working medium value changes suddenly to become larger or stronger. The working medium pressure is adjusted as a function of a control variable through pressure control or pressure reduction within a nominal pressure range and a maximum pressure range. The maximum pressure range is between the nominal pressure range and a system pressure value that is constituted, for example, by the maximum available pressure of a delivery device. In accordance with the invention, the method stands out because with equal changes of the control variable the change in the working medium pressure value in the maximum pressure range is greater than in the nominal pressure range. Graphically, that means that in an orthogonal coordinate system, where the control variable is plotted on one coordinate axis and the reproduced working medium pressure is plotted on the other coordinate axis, a characteristic line arises that is flatter in the nominal pressure range than in the maximum pressure range. That means that the pressure intensification is lower in the nominal pressure range, so that the overall hysteresis of the control system is less, thus allowing the working medium pressure on the hydraulic device to be adjusted more precisely. In the nominal pressure range, a precise adjustment range is therefore made available, while in the maximum pressure range there is a considerably coarser adjustment of the working medium pressure. The maximum pressure range can extend up to the maximum system pressure value.

Preferably, a medium pressure is utilized as the control variable for pressure control, so that a value for pressure control or pressure reduction can be easily controlled. It can also be provided, however, that an electric current or voltage, with which an electrically-controllable valve for pressure control or pressure reduction is controlled, can serve as the control variable.

One embodiment provides for the control variable to be modulated by a control means to which a pilot control value is provided. A pilot control value, which can be incorporated, for example, as a pilot pressure, is made available for the overall transmission control system, especially on automatic transmissions. The pilot pressure, for example, 5 bar, can be adjusted quite precisely with a pressure reduction valve. The control variable for pressure control or pressure reduction is then obtained from that pilot pressure. The control means can, therefore, be configured as an additional pressure reduction valve, or as an electrically-controlled proportional valve.

In a preferred embodiment, the hydraulic device is constructed as a steplessly adjustable speed ratio means in an automatic transmission. Such a speed ratio means is, for example, a belt-driven, conical pulley device in a stepless automatic transmission, such as is shown in German patent publication DE 195 46 293 A1. In that transmission, the application pressure between the conical disks and the endless, torque-transmitting means must be adjusted as a function of the transmitted torque. When the transmission is working under normal or nominal conditions, the working medium pressure for the pressing unit is varied to press together the conical disks within the nominal pressure range. Due to outside influences, however, it is possible that the pressing pressure must be increased beyond the nominal pressure range, in order to avoid slippage of the endless, torque-transmitting means. Such a situation can occur, for example, when a motor vehicle with such an automatic transmission accelerates on an icy surface, causing the driving wheels to spin, and when because of the continued movement of the vehicle the wheels then leave the icy surface and gain contact with the conventional pavement and no longer spin. That suddenly increases the transmitted torque beyond the nominal range. The working medium pressure for pressing the conical disks against the endless, torque-transmitting means in such special operating situations must be designed in such a way that from about 2 to about 2.5 times the maximum engine torque could be transmitted. That factor, also called the impact coefficient, reflects the upper limit of the maximum pressure range in which the pressing pressure can be varied.

In the nominal pressure range, on the other hand, only the nominal torque that is provided by the engine is transmitted. In that nominal range it is therefore important to be able to adjust the application pressure precisely. However, in the maximum pressure range precise adjustment is not absolutely required. Rather, slippage of the endless, torque-transmitting means on the conical disks must be prevented. With the method in accordance with the invention those requirements are achieved in a particularly advantageous manner, because the control variable-working pressure characteristic line is flatter in the nominal pressure range than in the maximum pressure range. Fine adjustment is thereby possible in the nominal pressure range. Nevertheless, the working medium pressure can be increased to the extent that sufficient application pressure can also be made available in special driving situations.

That purpose is also achieved by means of a control system for supplying a hydraulically-operated device with a working medium. That embodiment also can be beneficial where there is a sudden change. The control system has a pressure control valve or a pressure reduction valve, that is controllable by a control means with a control variable in order to adjust a working medium pressure on the hydraulically-operated device within a nominal pressure range and a maximum pressure range. The maximum pressure range is between a system pressure value and the nominal pressure range, wherein the system pressure value can be the maximum system pressure that can be made available by a delivery device.

In accordance with the invention, the control system distinguishes itself through an actuation means for the pressure control valve or the pressure reduction valve, whose valve body member is operated at a specified value of the control variable in such a way that with equal changes of the control variable, the change in working medium pressure in the maximum pressure range is greater than it is in the nominal pressure range. By means of the actuation means in accordance with the invention, for the pressure control valve or pressure reduction valve, a characteristic control line is provided that is flatter in the nominal pressure range than in the maximum pressure range. In that way, the pressure control valve, or the pressure reduction valve, is controlled by the actuation means in accordance with the invention in such a way that the nominal pressure range is a precision adjustment range, and in the maximum pressure range an increase of the working medium pressure higher than that in the nominal pressure range can be achieved. In accordance with an advantageous embodiment, it is expedient for the control means to be an electrically-operated proportional valve.

In a preferred embodiment, the pressure control valve or pressure reduction valve has a valve body member against which a control medium acts as a control variable, so that the control medium moves the valve body member in a valve bore in accordance with the pressure of the control medium.

Alternatively, it can also be provided that the pressure control valve or the pressure reduction valve includes a valve body controlled by an electrical device. For that purpose, solenoid valves, for example, can be utilized, in which the valve body member is moved in the valve bore as a function of the magnetic field.

A preferred embodiment of the control system is one in which the control means is a proportional valve that modulates the control variable for the pressure control valve or the pressure reduction valve by the pilot-control variable. When the pilot-control variable is a constant pilot-control pressure that is provided to the proportional valve, the control medium can be adjusted in accordance with the desired working medium pressure through a corresponding, preferably electrical, control of the proportional valve, so that the pressure control valve or the pressure reduction valve is opened correspondingly, and consequently the valve body member is moved by the control medium so that the desired working medium pressure to the hydraulically-operated device is set.

In a preferred embodiment, the proportional valve is therefore controlled electrically, whereby the pressure control valve or the pressure reduction valve is modulated by the pilot pressure as a function of the control of the control medium pressure.

In a particularly preferred exemplary embodiment it is provided that the valve body member of the pressure control valve or of the pressure reduction valve has a pressure feedback surface, on which the working medium pressure operates. A pressure balance is provided, with which the working medium pressure is regulated, and consequently maintains the desired working medium pressure value.

In a particularly preferred exemplary embodiment, the actuation means for the valve body member is constructed as a switching valve and is arranged upstream from the pressure feedback surface. By means of the switching valve the movement of the valve body member can, thus, be easily influenced. It can be provided in a further development of the invention to incorporate a feature based on which the actuation means, that is, the switching valve, is actuated by the control means and at least restricts, but preferably completely interrupts, the pressure feedback to the pressure feedback surface beyond a predetermined value of the control variable. A hydraulic, preferably adjustable, resistance can be located in the pressure feedback conduit, with which the pressure feedback can be more or less closed, released, and completely shut off beyond a predetermined value of the control variable. Beyond that predetermined pressure value, which is allocated in particular to the transition between the nominal pressure range and the maximum pressure range, the switching valve is therefore controlled in such a way that the working medium pressure is no longer applied to the pressure feedback surface. Thus, the position of the valve body member of the pressure control valve or the pressure reduction valve is only dependent upon the control variable and preferably upon a spring that acts against the valve body member. It is advantageous for the inflow to the pressure feedback surface to be closed, and that conduit, and thus also the pressure feedback surface, discharges in the direction of the reservoir.

Therewith, the pressure control or pressure reduction function is suddenly raised, and the working medium pressure adjusts itself to the system pressure in a step function.

Preferably, the control medium pressure is utilized for the control of the switching valve in order to be able to control the switching valve without any major shifting effort. Thereby, the control medium pressure is utilized for adjusting the working medium pressure within the nominal pressure range, and also for controlling the switching valve, which influences the pressure feedback of the working medium to the pressure feedback surface. Alternatively, it can also be provided to actuate the switching valve electrically by at least one or a second control means.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
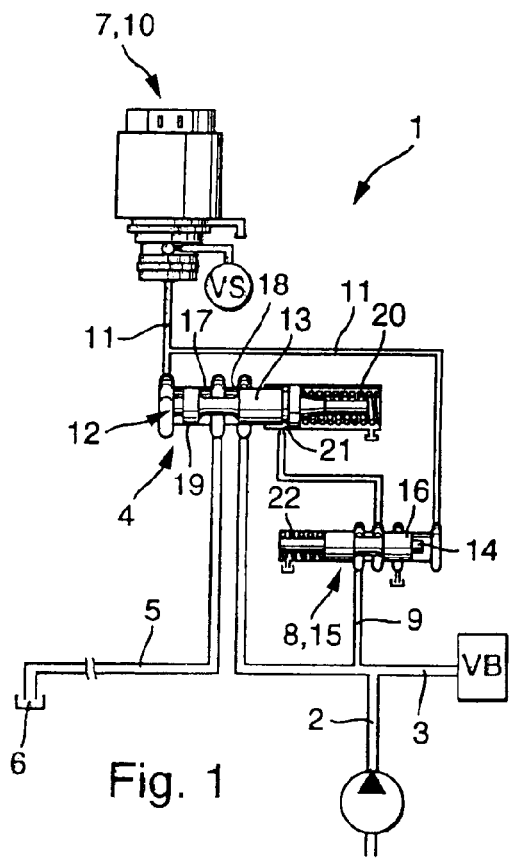
FIG. 1 shows a first embodiment of a control system for supplying a hydraulically-operated device with a working medium.

FIG. 1 shows a control system 1 for supplying a hydraulically-operated device VB with a working medium, which is delivered to the hydraulic device VB through a supply conduit 2 by means of a delivery device. Pressure control valve 4 of control system 1 is arranged in an outlet conduit 3, which leads away from the hydraulic device VB. Pressure control valve 4 opens the outlet conduit 3 via a return conduit 5 to a reservoir 6. In the return conduit 5 additional hydraulic devices can be arranged, such as a cooler, lubrication points, or a converter, that are part of an automatic transmission (not shown).

Further, the control system 1 has a control means 7 for the pressure control valve 4. Additionally, the control system 1 has an actuation means 8 that is arranged in a pressure return conduit 9 that extends from the outlet conduit 3 and leads to the pressure control valve 4.

Control means 7 is provided as, for example, an electrically-controllable proportional valve 10 supplied with a pilot control value that is implemented in the present example as pilot control pressure VS that is adjusted by a pressure reducing valve (not shown). As a function of the electrical control of the proportional valve 10, it modulates a control value based upon the pilot control pressure VS, which value is fed to a control surface 12 of a valve body member 13 of the pressure control valve 4 over a control conduit 11. Additionally, control conduit 11 leads to the actuation means 8, so that the control pressure also operates on the actuating surface 14 that serves as a pilot valve 15 of the actuation means, wherein the actuating surface 14 is provided on a valve body member 16 of the pilot valve 15.

The valve body member 13 of the pressure control valve 14 has a control edge 18 that is so configured on the valve body member 13 that depending on the position of the valve body member 13 in the valve bore 19, a connection from the outlet conduit 3 to the return conduit 5 can be opened, throttled, or closed. The position of the valve body member 13 is established by the pressure of the control medium on the control surface 12, the counteracting spring force of a spring 20 that bears against the valve body member 13, and the working medium pressure of the hydraulic device VB, which is fed via the pressure return conduit 9 to a pressure feedback surface 21 of the valve body member 13.

The position of valve body member 16 of the pilot valve 15 is based on the control pressure applied to the actuating surface 14 and the spring force of a spring 22, wherein preferably the pilot valve has only two control positions. In one control position the pressure return conduit 9 is unblocked; in the other control position the pressure return conduit 9 is discharging to the reservoir. Depending upon the control position of the actuation means 8, the pressure of the working medium of the hydraulic device therefore reaches the pressure feedback surface 21 or the reservoir, or is throttled in a transient response. Through that engagement with the pressure feedback surface, the pressure balance at the valve is disconnected, so that the slider is completely closed and the maximum system pressure is set.

Figure 3:
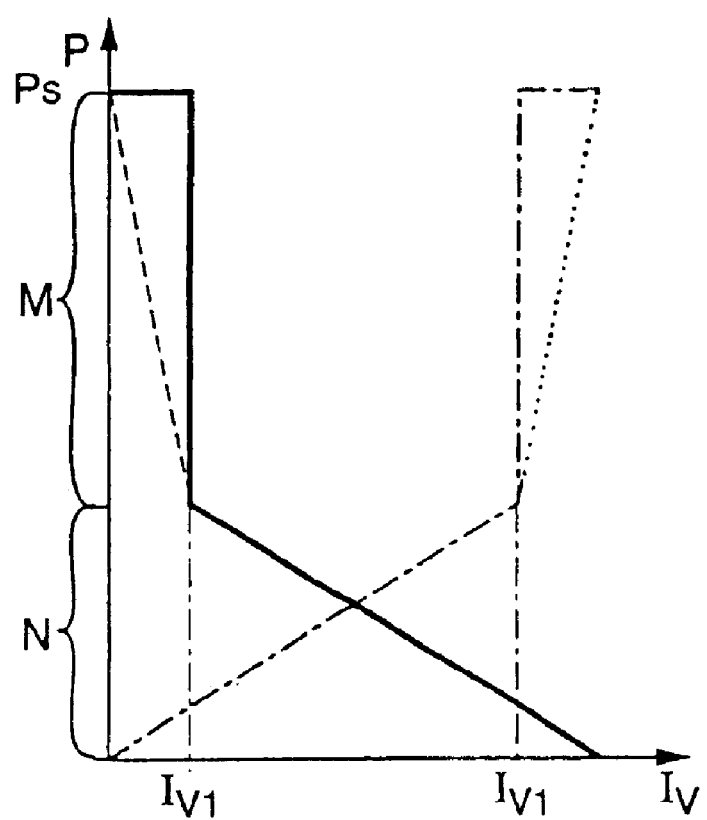
FIG. 3 is a graph showing control characteristic lines, wherein the working medium pressure provided to a hydraulic device is shown as a function of a pilot variable.

The operation of the control system 1 in accordance with FIG. 1 is illustrated based on FIG. 3. The electrically-controlled proportional valve 10 is supplied an electric pilot-control current $I_v$, which is plotted on the x-axis of the coordinate system in FIG. 3. From the pilot-control pressure VS, the proportional valve 10 modulates the control value, which is provided over control conduit 11. The pressure control valve 4 adjusts the working medium pressure to the hydraulic device as a function of the control value or the pilot-control current. The pressure P is plotted on the Y-axis of the coordinate system in FIG. 3. It is apparent that with a defined pilot-control current $I_{v1}$, the slope of the characteristic line changes, therefore the working medium pressure is increased. Depending on whether a proportional or reverse proportional connection exists between the pilot-control current $I_v$ and the control value, the working medium pressure rises with increasing pilot-control current $I_v$, as rendered by the dash-dot and dotted characteristic lines of the control system 1.

In the case of reverse proportionality between the pilot-control current $I_v$ and the working medium pressure or the control value, the working medium pressure rises with decreasing pilot-control current $I_v$, as rendered by the continuous and dashed characteristic lines in FIG. 3.

Depending on how the actuation means 8 is controlled or designed, either a sudden pressure increase up to a system pressure value $P_s$ takes place at a certain value of the pilot-control current $I_{v1}$, or the pressure increases at a steeper characteristic line up to the system pressure value $P_s$. It is apparent that the hydraulic device VB can be fed differing working medium pressures in a nominal pressure range N and a maximum pressure range M. Furthermore, it becomes evident that in the nominal pressure range N the characteristic line is less steep than in the maximum pressure range M. It can also be provided, as described above, that in the maximum pressure range M the characteristic line increases suddenly up to the system pressure value $P_s$.

Figure 2:
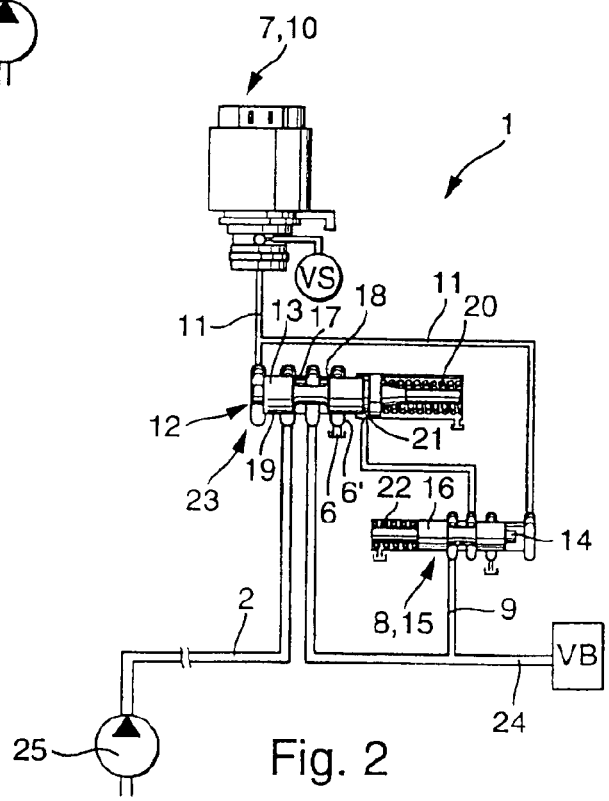
FIG. 2 shows a second embodiment of a control system for supplying a hydraulically-operated device with a working medium.

In the embodiment of a control system 1 shown in FIG. 2, similar parts or parts with similar functions have the same reference characters as in FIG. 1. There is thus no need to describe them again. Instead of the pressure control valve 4 in the embodiment in FIG. 1, the control system 1 includes a pressure reduction valve 23, to whose valve body member 13 the pressure from the control conduit 11 is applied to the control surface 12. The two control edges 17 and 18 of the valve body member are designed in such a way, or the valve body member 13 can be moved in the valve bore 19 in such a way, that the working medium coming from the supply conduit 2 is directed to the hydraulic device VB through a feed conduit 24, or that the working medium, such as the oil of the hydraulic device, that is fed via the conveying device 25, can be directed into the reservoir 6. Of course, it is also possible to incorporate positions of the valve body member 13 of the pressure reduction valve 23 so that only a partial flow of the conveyed working medium is fed into the reservoir 6. In FIG. 2, an additional conduit 6' extends from the valve bore 19 of the pressure reduction valve, leading to the reservoir 6.

For the operation of the actuation means 8, the same information as that provided for the control system 1 in FIG. 1 applies. The difference in the control systems 1 according to FIGS. 1 and 2 is that instead of the pressure control valve 4, the pressure reduction valve 23 is provided in FIG. 2. Depending on the proportionality between the pilot-control current 1 and the control medium pressure in the control conduit 11, the characteristic lines for the control systems 1 that are shown in FIG. 3 and previously described are produced.

Thus, the control system 1 that includes the actuation means 8 for the valve body member 13 of the pressure control valve 4, or the pressure reduction valve 23, provides a possibility for influencing the control characteristic so that in the nominal pressure range N a substantially smaller change of the working medium pressure P is achieved with an equal change in the control current $I_v$. It is also clear that due to the smaller slope of the characteristic line, the nominal pressure range N is a fine adjustment range, in which the working medium pressure can be adjusted with a high degree of precision as a function of the pilot-control current $I_v$. Nevertheless, it is possible to increase the working medium pressure on the hydraulic device VB to a maximum value, for example, the system pressure $P_s$, at a certain value of the pilot-control current $I_{v1}$, in order to be able to compensate for external forces affecting the hydraulic device. That is particularly the case when the hydraulic device VB is a pressure unit for a belt-driven, conical pulley transmission, wherein that pressure unit provides the pressing pressure or the pressing force between the conical disks and the endless torque-transmitting member, so that a torque can also be transmitted by the belt-driven, conical pulley transmission, which torque can be, for example, 2 to 2.5 times the maximum torque of the drive device, particularly an internal combustion engine.

The claims included in the application are illustrative and are without prejudice to acquiring wider patent protection. The applicant reserves the right to claim additional combinations of features disclosed in the specification or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A continuously variable, belt-driven, conical pulley transmission, said transmission comprising: a pair of conical disks; an endless, torque-transmitting member positioned between and in contact with the conical disks in torque-transmitting relationship; and a control system for a working medium pressure for hydraulically controlling a contact pressure of a movable conical disk against the endless torque-transmitting member of the transmission, said control system including one of a pressure control valve and a pressure reduction valve that is operatively connected with the movable conical disk and is controlled via a control means by a control variable in order to adjust a working medium pressure acting on the movable conical disk within a nominal pressure range and a maximum pressure range, wherein the maximum pressure range is between a system pressure value and the nominal pressure range, including an actuation means for the pressure control valve or pressure reduction valve that actuates a valve body member beyond a specified value of the control variable in such a way that with equal changes of the control variable the working medium pressure in the maximum pressure range changes more than in the nominal pressure range, and a control conduit connected with the control means and extending between and operatively connected with the actuation means and with the pressure control valve or pressure reduction valve for conducting a pilot pressure produced by the control means to the actuation means and to the pressure control valve or pressure reduction valve, whereby the control system operates to provide precise control of a contact pressure between the conical disks and the endless torque-transmitting member in the nominal pressure range and in the maximum pressure range, to prevent slippage between the conical disks and the endless torque-transmitting member.

2. A transmission in accordance with claim 1, wherein the pressure control valve or pressure reduction valve includes a valve body member that is operated by a control medium serving as a control variable.

3. A transmission in accordance with claim 1, wherein the proportional valve modulates the control medium pressure for the pressure control valve or pressure reduction valve from the pilot pressure as a function of its selection.

4. A transmission in accordance with claim 1, wherein the control means is a proportional valve that modulates the control variable from a pilot variable.

5. A transmission in accordance with claim 4, wherein the pilot variable is a pilot pressure and wherein the control means is a proportional valve that can be controlled electrically.

6. A transmission in accordance with claim 5, wherein the proportional valve modulates the control medium pressure for the pressure control valve or pressure reduction valve from the pilot pressure as a function of its selection.

7. A transmission in accordance with claim 1, wherein the valve body member of the pressure control valve or pressure reduction valve includes a pressure feedback surface against which the working medium pressure is applied.

8. A transmission in accordance with claim 7, wherein the actuation means is an on-off valve and is arranged downstream from the pressure feedback surface, and the actuation means is actuated by the control means, and wherein beyond a defined value of the control variable the pressure feedback to the pressure feedback surface is at least restricted.

9. A transmission in accordance with claim 8, wherein the on-off valve can be controlled via the control medium pressure.

10. A transmission in accordance with claim 8, wherein the on-off valve can be actuated electrically via the at least one control means.

11. A control system in accordance with claim 1, wherein the pilot pressure is operative in a direction against respective spring forces acting within the actuation means and within the pressure control valve or pressure reduction valve.

12. A method for operating a control system for a working medium pressure for hydraulically controlling a contact pressure of a movable conical disk against an endless torque-transmitting member of a continuously variable transmission, said method comprising the steps of: controlling a pressure control valve that is operatively connected with the movable conical disk, wherein control is via a control means by a control variable for adjusting a working medium pressure acting on the movable conical disk within a nominal pressure range and a maximum pressure range, wherein the maximum pressure range is between a system pressure value and the nominal pressure range; actuating a valve body member of the pressure control valve beyond a specified value of the control variable so that with equal changes of the control variable the working medium pressure in the maximum pressure range changes more than in the nominal pressure range; and conducting a pilot pressure from the control means to an actuation means operatively connected with the pressure control valve or pressure reduction valve and to the pressure control valve or pressure reduction valve, whereby the control system operates to provide precise control of a contact pressure between a pair of conical disks and the endless torque-transmitting member in the nominal pressure range and in the maximum pressure range, to prevent slippage between the conical disks and the endless torque-transmitting member.

13. A method in accordance with claim 12, wherein the pilot pressure is operative in a direction against respective spring forces acting within the actuation means and within the pressure control valve or pressure reduction valve.

* * * * *